United States Patent
Andre

(10) Patent No.: US 11,493,627 B2
(45) Date of Patent: Nov. 8, 2022

(54) METHOD, MODULE AND SYSTEM FOR DETERMINING A VELOCITY PROFILE OF SOUND WAVES IN A WATER COLUMN

(71) Applicant: NAVAL GROUP, Paris (FR)

(72) Inventor: Jonathan Andre, Lorient (FR)

(73) Assignee: NAVAL GROUP, Paris (FR)

( * ) Notice: Subject to any disclaimer, the term of this patent is extended or adjusted under 35 U.S.C. 154(b) by 101 days.

(21) Appl. No.: 16/764,491

(22) PCT Filed: Nov. 16, 2018

(86) PCT No.: PCT/EP2018/081649
§ 371 (c)(1),
(2) Date: May 15, 2020

(87) PCT Pub. No.: WO2019/097029
PCT Pub. Date: May 23, 2019

(65) Prior Publication Data
US 2020/0355825 A1    Nov. 12, 2020

(30) Foreign Application Priority Data

Nov. 17, 2017 (FR) .................................... 17 01193

(51) Int. Cl.
*G01S 15/58*    (2006.01)
*G01S 7/521*    (2006.01)
*G01S 15/60*    (2006.01)

(52) U.S. Cl.
CPC ............ *G01S 15/582* (2013.01); *G01S 7/521* (2013.01); *G01S 15/60* (2013.01)

(58) Field of Classification Search
CPC .......... G01S 15/18; G01S 15/58; G01S 7/521; G01S 15/60; Y02A 40/20; G01N 33/388
See application file for complete search history.

(56) References Cited

U.S. PATENT DOCUMENTS

| 5,483,499 A | 1/1996 | Brumley et al. |
| 5,568,450 A | 10/1996 | Grande et al. |
| 6,577,557 B1 * | 6/2003 | Stottlemyer ............. G01H 5/00 367/127 |

OTHER PUBLICATIONS

International Search Report, dated Jan. 31, 2019, from corresponding PCT application No. PCT/EP2018/081649.
French Search Report, dated Sep. 3, 2018, from corresponding French application No. 849564.
Sadalage et al.; Precise Estimation of Sound Velocity Profile and its Impact on Sediment Classification in the Tropical Shallow Freshwater Reservoirs; 2015 IEEE Underwater Technology (UT); Feb. 23, 2015; pp. 1-6.

* cited by examiner

*Primary Examiner* — Isam A Alsomiri
*Assistant Examiner* — Amie M Ndure
(74) *Attorney, Agent, or Firm* — Nixon & Vanderhye

(57) ABSTRACT

This method includes emitting, by an emitter at an emitting depth, moved along an axis, at least one incident sound wave at an emitting frequency, receiving a first sound wave reflected by a first reflective object at a first depth and a second sound wave reflected by a second reflective object at a second depth, greater than the first depth, providing a first velocity at the first depth, and determining a second velocity of the sound waves at the second depth, from the frequencies of the first and second reflected sound waves, the emitting frequency and the first velocity.

20 Claims, 2 Drawing Sheets

METHOD, MODULE AND SYSTEM FOR DETERMINING A VELOCITY PROFILE OF SOUND WAVES IN A WATER COLUMN

BACKGROUND OF THE INVENTION

Field of the Invention

The present invention relates to a method, module and system for determining a velocity profile of sound waves in a water column.

The present invention in particular applies to determining the velocity of sound waves in an underwater environment, as a function of the depth.

Knowing the velocity of sound waves as a function of the depth is for example necessary to improve the measuring performance of acoustic sensors, in particular to precisely determine the speed of a marine vehicle such as a ship relative to the seabed using the Loch-Doppler technique, to perform depth measurements, in particular to determine the water height value below a ship, or to use a sonar.

According to the Loch-Doppler technique, acoustic antennas, fastened on the hull of the ship, emit sound waves toward the seabed. These waves are reflected by the bed or the top of a deep layer of water, with a frequency shift, relative to the emission frequency, that depends on the speed of the ship. Comparing the frequency of the emitted wave with that of the reflected wave therefore makes it possible to determine the speed of the ship.

Nevertheless, the frequency shift also depends on the velocity of the sound waves in the marine environment. Indeed, the velocity of the sound is not constant, but depends on the temperature, salinity and immersion.

Furthermore, the precise determination of the bottom height using a sounding machine also requires knowledge that is as precise as possible of the velocity profile in the water column.

It is therefore desirable, before taking any measurements via acoustic sensors, to establish a velocity profile of the sound waves in the marine environment in which the ship is moving.

Description of Related Art

To establish such a velocity profile, it is known to use bathycelerimetric probes, for example probes of the XSV type, or bathythermographic probes, for example probes of the CTD or XCTD type.

Bathycelerimetric probes take a measurement of the velocity directly, in general by phase measurement, while bathythermographic probes determine the velocity profile by measuring the temperature of the water, and optionally its salinity, as a function of the immersion.

Such solutions are not fully satisfactory.

Indeed, bathycelerimetric and bathythermographic probes are expensive, and indiscreet to use.

Furthermore, these probes are submerged at depths that may be substantial and subject to strong mechanical stresses that may damage them. Losable probes are commonly used, which are only used once, and must therefore be renewed constantly.

BRIEF SUMMARY OF THE INVENTION

One aim of the invention is therefore to provide a method and a system for determining a velocity profile of a water column that is at once precise, reusable and inexpensive.

To that end, the invention relates to a method of the aforementioned type, characterized in that it comprises the following steps:
  emitting in said water column, by an emitter located in the water column at an emitting depth, at least one incident sound wave emitted at least at one emission frequency, said emitter being moved along at least one axis relative to said water column,
  receiving, by a receiver, at least one first sound wave reflected by a first reflective object located in said water column at a first depth and a second sound wave reflected by a second reflective object located in said water column at a second depth, greater than the first depth,
  providing a first velocity of the sound waves at said first depth,
  determining a second velocity of the sound waves at said second depth, from the frequencies of said first and said second reflected sound waves, the emitting frequency and said first velocity.

The method according to the invention may comprise one or more of the following features, considered alone or according to any technically possible combination:
  said second velocity is determined as:

$$C_2 = \frac{\Delta f_1}{\Delta f_2} \cdot C_1,$$

Where: $\Delta f_1 = f_1 - f_0$,
  $\Delta f_2 = f_2 - f_0$,
  $f_0$ is the emitting frequency,
  $f_1$ is the frequency of the first reflected sound wave,
  $f_2$ is the frequency of the second reflected sound wave,
  $C_1$ is the first velocity at the first depth.
  the method further comprises:
    providing a value of said first depth,
    determining a value of said second depth, as a function of said second velocity and/or said first velocity, the value of said first depth and the time gap between the reception by the receiver of the sound wave reflected by said first reflective object and the reception by the receiver of the sound wave reflected by said second reflective object;
  said receiver is moved along said axis in said water column, preferably identically to the movement of said emitter;
  said emitter and said receiver are secured or combined;
  the provision of the first velocity comprises the following phases:
    determining a velocity of the sound waves at said emitting depth,
    determining the first velocity, from said frequency of the first reflected sound wave, said emitting frequency and the velocity at said emitting depth;
  the determination of the first velocity comprises:
    estimating an average movement speed of said emitter in said water column along said axis, from the velocity at said emitting depth,
    determining said first velocity, from the frequency of the first reflected sound wave, the emitting frequency and said estimated average movement speed;
  said first velocity is determined as:

$$C_1 = 2\frac{f_0}{\Delta f_1} \cdot V_Z,$$

where: $V_Z$ is the estimated movement speed of said emitter in said water column along said axis;

the provision of the first velocity comprises determining the first velocity using a probe located at said first depth;

the method comprises the following steps:

reception, by said receiver, of a plurality of sound waves reflected by a plurality of reflective objects located in said water column at a plurality of increasing depths, implementing a plurality of successive and iterative steps for determining velocities of the sound waves at said plurality of increasing depths, the velocity at each depth being determined from the frequency of the wave reflected by the reflective object at said depth, the frequency of a wave reflected by a reflective object located in said water column at the preceding depth, the emission frequency and the velocity of the sound waves at said preceding depth;

the velocity of the sound waves at each depth is determined as:

$$C_i = \frac{\Delta f_{i-1}}{\Delta f_i} \cdot C_{i-1},$$

Where: $\Delta f_i = f_i - f_0$, $\Delta f_{i-1} = f_{i-1} - f_0$, $f_i$ is the frequency of the sound wave reflected at said depth, $f_{i-1}$ is the frequency of the sound wave reflected at the preceding depth, $C_{i-1}$ is the velocity at the preceding depth.

the method further comprises the iterative determination of the value of each depth, the value of each given depth being determined as a function of the preceding depth previously determined, the velocity of the sound waves determined at said given depth and/or the velocity of the sound waves at the preceding depth, and a time gap between the reception by the receiver of the sound wave reflected by a reflective object at said preceding depth and the reception by the receiver of the sound wave reflected by a reflective object at said given depth.

The invention further relates to a module for determining a velocity profile of sound waves in a water column for the implementation of a method according to the invention, said module being suitable for determining, from frequencies of said first and said second reflected sound waves, from the emission frequency and said first velocity, the second velocity of the sound waves at said second depth.

The invention also relates to a system for determining a velocity profile of sound waves in a water column, said system comprising:

an emitter suitable for emitting in said water column, from an emitting depth, at least one incident sound wave emitted at least at one emission frequency, said emitter being moved along at least one axis relative to said water column, a receiver suitable for receiving at least one first sound wave reflected by a first object located in said water column at a first depth, and a second sound wave reflected by a second object located in said water column at a second depth, greater than the first depth, a module for determining the velocity profile according to the invention.

According to one embodiment, said emitter and said receiver are secured or combined.

BRIEF DESCRIPTION OF THE SEVERAL VIEWS OF THE DRAWINGS

The invention will be better understood upon reading the following description, provided solely as an example and done in reference to the appended drawings, in which.

DETAILED DESCRIPTION OF THE INVENTION

Figure 1:
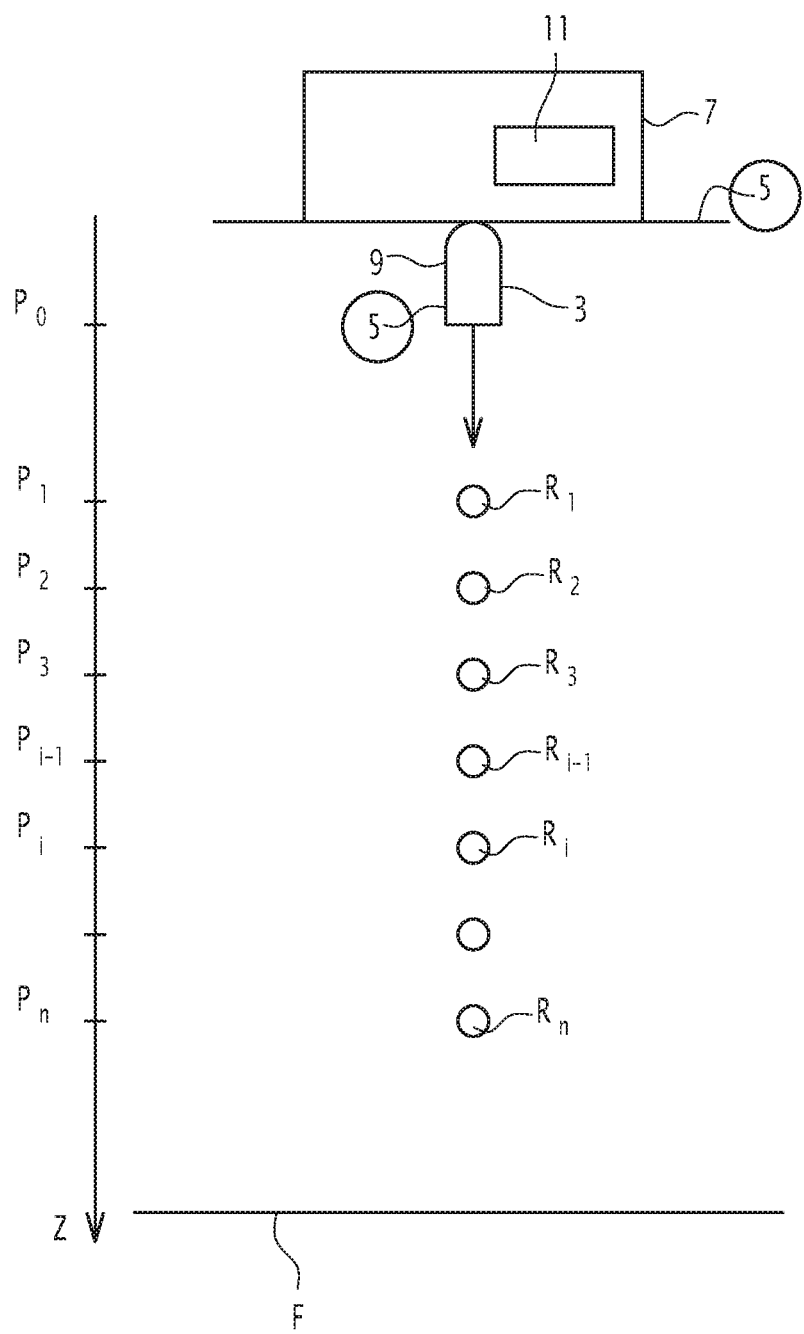
FIG. 1 is a diagram, in profile view, of a water column and a system according to one embodiment of the invention, placed on a ship, for determining the velocity of sound waves in the water column.

FIG. 1 illustrates a system for determining the velocity profile of a water column according to one embodiment of the invention.

The water column, which is for example a water column in a marine environment, extends between the surface S and the bottom F, the depth of which is variable.

Hereinafter, "depth" refers to a point of the water column in terms of the distance, along a vertical axis, between the surface S and said point. The depth therefore increases from the surface toward the bottom.

The water column includes many inhomogeneities, for example suspended particles, living organisms (fish, plankton), which may generate reflections of sound waves emitted by an emitter.

According to the invention, the sound waves reflected by such inhomogeneities at various depths of the water column are used to determine, from one to the next, from the surface toward the bottom, the velocity of the sound waves at these various depths, taking advantage of the Doppler effect resulting from a relative movement of the emitter and the receiver of the sound waves, relative to the water column, therefore relative to the inhomogeneities.

To that end, the system illustrated in FIG. 1 comprises an emitter 3 of sound waves and a receiver 5 of sound waves.

The emitter 3 and the receiver 5 are intended to be attached to a carrier 7, which is for example a ship or submarine, while being submerged in the water column, at a shallow depth $P_0$, for example between 2 and 10 meters.

The depth $P_0$ will be called emission depth hereinafter.

Thus attached, the emitter 3 and the receiver 5 will be moved relative to the water column.

This movement can be due to the swell, which generates a movement of the hull of the carrier 7, therefore of the emitter 3 and the receiver 5. Such a movement takes place primarily along a vertical axis Z.

This movement can also be due to an intentional movement of the carrier 7 along at least one horizontal axis X and/or Y, causing a corresponding movement of the emitter 3 and the receiver 5.

In the following disclosure, first only the component along the axis Z of the speed of the emitter 3 and the receiver 5 is considered, which are respectively denoted $V_{Z3}$ and $V_{Z5}$.

The emitter 3 and the receiver 5 are preferably combined and form an emitter-receiver.

In a variant, the emitter 3 and receiver 5 are separate, but are moved in the same way relative to the water column. For example, the emitter 3 and the receiver 5 are integral.

In both of these cases, the speeds $V_{Z3}$ and $V_{Z5}$ are equal, and will be denoted $V_Z$ hereinafter.

The emitter 3 is configured to emit sound waves in the water column, toward the bottom, with an incidence angle, relative to the vertical, that is nil in the example illustrated in FIG. 1.

These sound waves may comprise one or several components at various frequencies. It will nevertheless be considered hereinafter, for simplification, that the emitted sound wave comprises a single component at a predetermined emission frequency $f_0$. The emission frequency $f_0$ is for example between 100 and 400 kHz.

Of course, the invention may be implemented by emitting a sound wave comprising at least two components at different frequencies, one or several corresponding components of the reflected waves being able to be used to determine the velocity profile.

Preferably, the system further includes a probe 9, for example a sea water temperature probe, a bathycelerimetric or bathythermographic probe, configured to determine the velocity, denoted $C_0$, of the sound waves at the emission depth $P_0$. For example, the probe 9 is integrated into the emitter 3 and/or into the receiver 5.

During its propagation in the water column, a sound wave emitted by the emitter 3 is subject to partial reflections by various objects located in the water column at various depths. These objects, hereinafter called reflective objects or simply reflectors, are in particular inhomogeneities, as described above.

The receiver 5 is configured to receive these reflected waves.

The system of FIG. 1 further includes a module 11 for determining a velocity profile of the sound waves in the water column, from the knowledge of the emitted and reflected sound waves.

In particular, the determining module 11 is connected to the emitter 3. The module 11 is configured to control the emission of sound waves by the emitter at the emitting frequency $f_0$.

The determining module 11 is also connected to the receiver 5. The module 11 is configured to receive, from the receiver 5, electrical signals representative of the reflected sound waves received by the receiver 5.

The module 11 is configured to analyze the sound waves received by the receiver 5, and to identify and select, among these sound waves, sound waves reflected by reflectors located in the water column at various depths.

The module 11 is further configured to sequence these reflectors spatially in the water column along the axis Z, as a function of the travel time elapsed between the emission of the incident wave and the reception of each of the reflected sound waves. Each reflector therefore has an associated index denoted i, representing the position of this object relative to the other reflectors.

The index i increases with the depth from the index 1 corresponding to a first depth $P_1$ to an index n corresponding to a maximum depth $P_n$ at which the velocity of the sound waves must be determined. This maximum depth for example corresponds to the depth of the sea bed. In this case, the sound wave reflected at the maximum depth $P_n$ is a wave reflected by the sea bed.

In a variant, the maximum depth $P_n$ is a depth smaller than that of the sea bed.

The maximum depth $P_n$ can for example reach 200 meters. Thus, the maximum depth $P_n$ can for example be between 50 and 200 meters, in particular between 100 and 200 meters, in particular between 150 meters and 200 meters.

Furthermore, the module 11 is configured to determine, from one to the next, from the shallow depths to the greater depths, and iteratively, the depth at which each of these reflectors is located as well as the velocity of the sound at this depth.

In particular, the depth $P_i$ of a given reflector, denoted $R_i$, is determined from the previously determined depth $P_{i-1}$ of the preceding reflector $R_{i-1}$. The velocity of the sound $C_i$ at this depth $P_i$ is determined from the velocity of the sound $C_{i-1}$ previously determined at the preceding depth $P_{i-1}$.

The velocity of the sound $C_i$ at the depth $P_i$ is in particular determined as a function of the frequency $f_i$ of the wave reflected by the reflector $R_i$, the frequency $f_{i-1}$ of the wave reflected by the preceding reflector $R_{i-1}$, the frequency $f_0$ of the emitted wave, and the velocity $C_{i-1}$ previously determined at the preceding depth $P_{i-1}$.

In particular, the module 11 uses the Doppler effect, that is to say, the difference in frequency between the emitted wave and the reflected wave, resulting from the movement of the emitter 3 and the receiver 5 relative to the reflectors $R_i$ and $R_{i-1}$.

The frequency $f_i$ of a reflected wave refers to the frequency of the reflected wave as received by the receiver 5. Indeed, a first frequency shift is caused by the relative movement of the emitter 3 with respect to the reflector, and a second frequency shift is due to the relative movement of the reflector with respect to the receiver 5. Thus, the frequency of a reflected wave, during its reflection by a reflector, differs from the frequency of this reflected wave as received by the receiver 5.

The speeds $V_{Z3}$ and $V_{Z5}$, and, considering that the emitter 3 and the receiver 5 are moved in the same way, the speed $V_Z$, are low compared to that of the sound.

In general, the frequency $f_i$ of a reflected wave, as received by the receiver 5, is equal, by Doppler effect, to:

$$f_i = f_0 \cdot \left(1 + \frac{V_{Z3} + V_{Z5}}{C_i}\right).$$

In the case where the emitter 3 and the receiver 5 are moved in the same way relative to the reflector $R_i$, the frequency $f_i$ of a reflected wave, as received by the receiver 5, is therefore equal, by Doppler effect, to:

$$f_i = f_0 \cdot \left(1 + 2\frac{V_Z}{C_i}\right).$$

Likewise, the frequency $f_{i-1}$ of the wave reflected by the preceding reflector $R_{i-1}$, is equal to:

$$f_{i-1} = f_0 \cdot \left(1 + 2\frac{V_Z}{C_{i-1}}\right)$$

The module 11 is thus able to determine the velocity of the sound $C_i$ at the depth $P_i$ of the reflector $R_i$, from the velocity $C_{i-1}$ previously determined at the preceding depth $P_{i-1}$, as:

$$C_i = \frac{\Delta f_{i-1}}{\Delta f_i} \cdot C_{i-1},$$

Where: $\Delta f_{i-1} = f_{i-1} - f_0$, $\Delta f_i = f_i - f_0$.

Furthermore, the module 11 is configured to determine the depth $P_i$ as a function of the previously determined depth $P_{i-1}$ and the difference in travel time between the wave reflected by the reflector $R_{i-1}$ and the wave reflected by the reflector $R_i$, that is to say, the time gap $\Delta t_i$ between the reception by the receiver 5 of the wave reflected by the reflector $R_{i-1}$ and the reception by the receiver 5 of the wave reflected by the reflector $R_i$.

For example, the depth $P_i$ is determined as a function of the previously determined depth $P_{i-1}$, the velocity $C_i$, the velocity $C_{i-1}$ at the preceding depth $P_{i-1}$, and the time gap $\Delta t_i$.

In particular, considering that the velocity of the sound waves between the reflector Ri−1 and the reflector Ri is equal to the average of the velocities $C_{i-1}$ and $C_i$, the depth Pi can be determined by the module 11 as:

$$P_i = P_{i-1} + \Delta t_i \cdot \frac{C_i + C_{i-1}}{4}.$$

In particular, according to a variant, the module 11 is configured to determine the depth $P_i$, from the depth $P_{i-1}$, of the velocity $C_{i-1}$ of the waves at the depth $P_{i-1}$, and the time gap $\Delta t_i$ as:

$$P_i = P_{i-1} + \Delta t_i \cdot \frac{C_{i-1}}{2}$$

In order to initialize the calculation, the module 11 is configured to determine a first velocity $C_1$ of the waves at the first depth $P_1$.

As an example, in order to determine this first velocity $C_1$, the module 11 estimates the depth $P_1$ by first approximation, considering that the velocity of the waves between the emitter 3/the receiver 5 and the first reflector $R_1$ is equal to the velocity $C_0$, and from the travel time measured between the emission of an incident sound wave and the reception of the sound wave reflected by the first reflector $R_1$.

The module 11 is also able to estimate an average movement speed $V_Z$ of the carrier 7 in the water column along the axis Z, from the velocity $C_0$, for example by estimating the depth $P_1$ at two separate, but close instants, a variation of this estimated depth $P_1$ resulting from the movement of the carrier 7, therefore from the movement of the emitter 3 and the receiver 5, between these two separate instants.

The module 11 is next able to determine the first velocity $C_1$ from the different in frequency between the emitted sound wave and the sound wave reflected by the first reflector $R_1$, as received by the receiver 5, according to:

$$C_1 = 2 \frac{f_0}{\Delta f_1} \cdot V_Z,$$

Where $\Delta f_1 = f_1 - f_0$, $f_0$ is the emitting frequency, $f_1$ is the frequency of the first reflected sound wave.

From the value of the determined first velocity $C_1$, the module 11 is able to determine, by iteration, from one to the next, the velocity of the sound waves at each of the depths Pi, and this depth Pi, and thus to obtain a velocity profile of the sound waves in the water column.

Such a velocity profile comprises a set of depths Pi (i=0 ... n), and the set of velocities Ci (i=0 ... n) determined at these depths.

Figure 2:
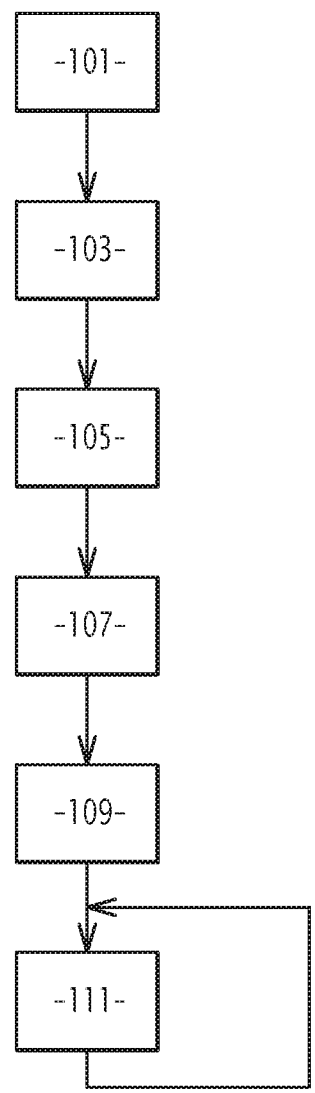
FIG. 2 is a block diagram illustrating one embodiment of a method according to the invention.

One exemplary embodiment of a method according to the invention, using the system described in reference to FIG. 1, for determining a velocity profile of the sound waves in a water column, will now be described in reference to FIG. 2.

In this example, it is considered that the carrier 7, therefore the emitter 3 and the receiver 5, is moved vertically along the axis Z, with a speed $V_Z$.

During an initial step 101, the probe 9 determines the velocity $C_0$ of the waves at the depth $P_0$.

Then, during a step 103, the module 11 commands the emitting, by the emitter 3, of at least one sound wave at the frequency $f_0$ in the water column, toward the sea bed.

During its propagation in the water column, a sound wave emitted by the emitter 3 is subject to partial reflections by reflectors.

During a step 105, the receiver 5 receives the sound waves reflected by the marine environment, including the reflections by the reflectors, and transmits them to the module 11.

Then, during a step 107, the module 11 analyzes the received sound waves, and selects, among these sound waves, sound waves reflected by reflectors $R_i$ located in the water column at various depths $P_i$.

During this step 107, the module 11 sequences these reflectors $R_i$ spatially in the water column along the axis Z, as a function of the travel time elapsed between the emission of the incident wave and the reception of each of the reflected sound waves.

During a step 109, the module 11 determines the frequency $f_1$ of the first reflected sound wave, then determines the first velocity $C_1$ at the first depth $P_1$, from the frequency $f_1$, the emission frequency $f_0$ and the velocity $C_0$ measured during step 101.

In particular, during step 109, the module 11 estimates an average movement speed of the emitter and the receiver in the water column along the axis Z, then determines the first velocity $C_1$ as:

$$C_1 = 2 \frac{f_0}{\Delta f_1} \cdot V_Z$$

Then, during a plurality of successive steps 111, implemented iteratively, the module 11 successively determines the velocity $C_i$ of the sound waves at each of the depths $P_i$, as well as the value of this depth $P_i$.

Each velocity $C_i$ is determined from the frequency $f_i$ of the sound wave reflected at the depth $P_i$, the frequency $f_{i-1}$ reflected at the preceding depth $P_{i-1}$, the emitting frequency $f_0$, and the velocity $C_{i-1}$ determined during the preceding step 109 (or, if step 111 is the first to be implemented, the velocity $C_1$ determined during step 109).

During each step 111, the module 11 determines the frequency fi, then determines the velocity $C_i$ as:

$$C_i = \frac{\Delta f_{i-1}}{\Delta f_i} \cdot C_{i-1}$$

Furthermore, the module 11 determines, during each step 111, the depth $P_i$ at which the reflector is located. The depth $P_i$ is determined from the preceding depth $P_{i-1}$, determined during the preceding step 111 (or, if it involves the depth $C_1$, during step 109), the velocity $C_i$ and/or the velocity $C_{i-1}$ at the preceding depth, and the difference in travel time between the wave reflected by the reflector $R_{i-1}$ and the wave reflected by the reflector $R_i$, that is to say, the time gap between the reception by the receiver 5 of the wave reflected by the reflector $R_{i-1}$ and the reception by the receiver 5 of the wave reflected by the reflector $R_i$.

Thus, during a first step 111, the module 11 determines the velocity $C_2$ of the sound waves at the depth $P_2$, and the depth $P_2$.

During each following step 111, the module 11 determines the velocity $C_i$ of the sound waves at a depth $P_i$, and the depth $P_i$.

The system and the method according to the invention therefore allow the precise, inexpensive and discrete establishment of a velocity profile of the sound waves in the water column.

According to a variant, the incidence angle formed by the sound waves emitted with the vertical is not nil, for example between 15° and 30°. In such a variant, the calculations and the method described above of course remain applicable. In particular, each depth is determined by calculating the component along the axis Z of the distance between the emitter 3 and each reflective object Ri.

According to another variant, the velocity of the sound waves at the first depth $P_1$ is determined by a probe submerged at that depth, for example a bathycelerimetric probe.

According to another embodiment, the carrier 7 is moved along at least one horizontal axis X or Y, for example along the horizontal axis X.

In this embodiment, the calculations and the method described above also remain applicable, by replacing, in the equations above, the vertical component of the speed Vz with the horizontal component $V_X$ or $V_Y$ of the speed.

Preferably, a determination of a first velocity profile is done by imparting to the carrier 7, therefore to the emitter 3 and the receiver 5, a first movement along a horizontal axis X or Y, a determination of a second velocity profile is done by imparting to the carrier 7, therefore to the emitter 3 and the receiver 5, a second movement along a horizontal axis X or Y, inverse with respect to the first movement (i.e., in the opposite direction and with the same absolute speed), then by averaging the first and second obtained velocity profiles, in order to cancel out the potential effect of a marine current on the calculation.

According to a variant, the successive depths $P_2, \ldots P_i \ldots P_n$ are predefined, and the module 11 iteratively selects the waves reflected by reflectors $R_2, \ldots R_i \ldots R_n$ located at these depths.

Thus, from the depth $P_1$ and the velocity $C_1$, the module 11 selects a wave reflected by a reflector at the predefined depth $P_2$. This wave is such that the time gap $\Delta t_2$ between the reception by the receiver 5 of the wave reflected by the reflector $R_1$ and the reception by the receiver 5 of the wave reflected by the reflector $R_2$ verifies the equation:

$$P_2 = P_1 + \Delta t_2 \cdot \frac{C_1}{2},$$

The module 11 thus selects the wave reflected by a reflector at the predefined depth $P_2$ by selecting the wave received at the instant:

$$t_2 = (P_2 - P_1) \cdot \frac{2}{C_1} + t_1,$$

Where $t_1$ is the reception instant of the wave reflected by the reflector $R_1$ at the depth $P_1$.

The velocity of the waves at the depth $P_2$ is determined as described above.

Then, from each depth $P_{i-1}$, and the associated velocity $C_{i-1}$, the module 11 selects a wave reflected by a reflector at the predefined depth $P_i$. This wave is such that the time gap $\Delta t_i$ between the reception by the receiver 5 of the wave reflected by the reflector $R_{i-1}$ and the reception by the receiver 5 of the wave reflected by the reflector $R_i$ verifies the equation:

$$P_i = P_{i-1} + \Delta t_i \cdot \frac{C_{i-1}}{2}.$$

The module 11 thus selects the wave reflected by a reflector at the predefined depth $P_i$ by selecting the wave received at the instant:

$$t_i = (P_i - P_{i-1}) \cdot \frac{2}{C_{i-1}} + t_{i-1},$$

Where $t_{i-1}$ is the reception instant of the wave reflected by the reflector $R_{i-1}$ at the depth $P_{i-1}$.

This variant makes it possible to select the successive depths at which a velocity value is determined.

In the exemplary embodiment of the invention, the module 11 is made in the form of software stored in a memory and able to be executed by a processor, associated with the memory, the processor and the memory forming a single information processing unit. In a variant, the module 11 is at least partially made in the form of programmable logic components, or in the form of dedicated integrated circuits.

The invention claimed is:

1. A method for determining a velocity profile of sound waves in a water column, said method comprising the following steps:
    emitting in said water column, by an emitter located in the water column at an emitting depth, an incident sound wave emitted at an emitting frequency, said emitter being moved along an axis extending along a length of said water column in a depth direction;
    receiving, by a receiver, a first sound wave reflected by a first reflective object located in said water column at a first depth, and a second sound wave reflected by a second reflective object located in said water column at a second depth, the second depth being greater than the first depth;
    determining a first velocity of the sound waves at said first depth; and
    using a frequency of the first reflected sound wave, a frequency of the second reflected sound wave, the emitting frequency, and said first velocity to determine a second velocity of the sound waves at said second depth.

2. The determining method according to claim 1, wherein said second velocity of the sound waves at said second depth is determined as:

$$C_2 = \frac{\Delta f_1}{\Delta f_2} \cdot C_1,$$

where:
- $C_2$ is the second velocity,
- $\Delta f_1 = f_1 - f_0$,
- $\Delta f_2 = f_2 - f_0$,
- $f_0$ is the emitting frequency,
- $f_1$ is the frequency of the first reflected sound wave,
- $f_2$ is the frequency of the second reflected sound wave, and
- $C_1$ is the first velocity of the sound waves at the first depth.

3. The method according to claim 1, further comprising:
providing a value of said first depth; and
determining a value of said second depth, as a function of said second velocity and/or said first velocity, the value of said first depth and a time gap between a reception by the receiver of the sound wave reflected by said first reflective object and a reception by the receiver of the sound wave reflected by said second reflective object.

4. The method according to claim 1, wherein said receiver is moved along said axis of said water column.

5. The method according to claim 4, wherein said emitter and said receiver are secured or combined.

6. The determining method according to claim 1, wherein the determining of the first velocity comprises the following phases:
determining a velocity of the sound waves at said emitting depth, and
using said frequency of the first reflected sound wave, said emitting frequency, and the velocity at said emitting depth to determine the first velocity.

7. The method according to claim 1, wherein the determining of the first velocity comprises the following phases:
determining a velocity of the sound waves at said emitting depth, and
using said frequency of the first reflected sound wave, said emitting frequency, and an estimated average movement speed of said emitter in said water column along said axis at said emitting depth to determine the first velocity,
wherein the average movement speed is estimated from the velocity at said emitting depth.

8. The method according to claim 7, wherein said first velocity is determined as:

$$C_1 = 2\frac{f_0}{\Delta f_1} \cdot V_Z,$$

where:
$V_Z$ is the estimated movement speed of said emitter in said water column along said axis.

9. The method according to claim 1, wherein the determining of the first velocity comprises using a probe located at said first depth.

10. The method according to claim 1, further comprising:
reception, by said receiver, of a plurality of sound waves reflected by a plurality of reflective objects located in said water column at a plurality of increasing depths; and
implementing a plurality of successive and iterative steps for determining velocities of the sound waves at said plurality of increasing depths,
where the velocity at each depth is determined from the frequency of the wave reflected by the reflective object at said depth, the frequency of a wave reflected by a reflective object located in said water column at the preceding depth, the emission frequency and the velocity of the sound waves at said preceding depth.

11. The method according to claim 10, wherein the velocity of the sound waves at each depth is determined as:

$$C_i = \frac{\Delta f_{i-1}}{\Delta f_i} \cdot C_{i-1},$$

where:
- $\Delta f_i = f_i - f_0$,
- $\Delta f_{i-1} = f_{i-1} - f_0$,
- $f_i$ is the frequency of the sound wave reflected at said depth,
- $f_{i-1}$ is the frequency of the sound wave reflected at the preceding depth, and
- $C_{i-1}$ is the velocity at the preceding depth.

12. The method according to claim 10, further comprising an iterative determination of the value of each depth, the value of each given depth being determined as a function of the preceding depth previously determined, the velocity of the sound waves determined at said given depth and/or the velocity of the sound waves at the preceding depth, and a time gap between the reception by the receiver of the sound wave reflected by a reflective object at said preceding depth and the reception by the receiver of the sound wave reflected by a reflective object at said given depth.

13. A module for determining a velocity profile of sound waves in a water column for the implementation of a method according to claim 1, said module being suitable for determining, from frequencies of said first and said second reflected sound waves, from the emission frequency and said first velocity, the second velocity of the sound waves at said second depth.

14. A system for determining a velocity profile of sound waves in a water column, said system comprising:
an emitter suitable for emitting in said water column, from an emitting depth, an incident sound wave emitted at an emission frequency, said emitter being moved along an axis relative to said water column;
a receiver suitable for receiving a first sound wave reflected by a first object located in said water column at a first depth, and a second sound wave reflected by a second object located in said water column at a second depth, greater than the first depth; and
a module for determining the velocity profile according to claim 13.

15. The system according to claim 14, wherein said emitter and said receiver are secured or combined.

16. The method according to claim 4, wherein the receiver has a movement along said axis in said water column identical to the movement of said emitter.

17. The method according to claim 2, further comprising:
providing a value of said first depth; and
determining a value of said second depth, as a function of said second velocity and/or said first velocity, the value of said first depth and a time gap between a reception by the receiver of the sound wave reflected by said first reflective object and a reception by the receiver of the sound wave reflected by said second reflective object.

18. The method according to claim 2, wherein said receiver is moved along said axis of said water column.

19. The method according to claim 3, wherein said receiver is moved along said axis of said water column.

20. The determining method according to claim 2, wherein the determining of the first velocity comprises the following phases:
   determining a velocity of the sound waves at said emitting depth, and
   using said frequency of the first reflected sound wave, said emitting frequency, and the velocity at said emitting depth to determine the first velocity.

\* \* \* \* \*